US012673690B2

(12) United States Patent
Sabatini et al.

(10) Patent No.: US 12,673,690 B2
(45) Date of Patent: Jul. 7, 2026

(54) APPARATUS AND METHOD FOR ASSISTING AN AUTONOMOUS VEHICLE AND/OR A DRIVER OF A VEHICLE

(71) Applicant: Yinwang Intelligent Technologies Co., Ltd., Shenzhen (CN)

(72) Inventors: Stefano Sabatini, Munich (DE); Thomas Gilles, Munich (DE); Dzmitry Tsishkou, Boulogne Billancourt (FR)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 82 days.

(21) Appl. No.: 18/510,257

(22) Filed: Nov. 15, 2023

(65) Prior Publication Data

US 2024/0092382 A1 Mar. 21, 2024

Related U.S. Application Data

(63) Continuation of application No. PCT/EP2021/063259, filed on May 19, 2021.

(51) Int. Cl.
*B60W 50/14* (2020.01)
*B60W 50/00* (2006.01)
(Continued)

(52) U.S. Cl.
CPC ........ *B60W 50/14* (2013.01); *B60W 50/0097* (2013.01); *B60W 60/0027* (2020.02); *G06N 3/02* (2013.01); *G06T 7/70* (2017.01); *G06V 10/82* (2022.01); *G06V 20/58* (2022.01);

*B60W 2050/143* (2013.01); *B60W 2050/146* (2013.01); *B60W 2420/403* (2013.01);
(Continued)

(58) Field of Classification Search
None
See application file for complete search history.

(56) References Cited

U.S. PATENT DOCUMENTS 9,248,834 B1 2/2016 Ferguson et al.
10,595,037 B2 * 3/2020 Choi ......................... G06T 7/20
(Continued)

FOREIGN PATENT DOCUMENTS

DE 102012005272 A1 10/2012
EP 2463843 B1 7/2015
(Continued)

*Primary Examiner* — Jelani A Smith
(74) *Attorney, Agent, or Firm* — Leydig, Voit & Mayer, Ltd.

(57) ABSTRACT

An apparatus for assisting a control system and/or a driver of a vehicle is provided. The apparatus comprises a processing circuitry configured to: determine for a plurality of positions within a vicinity of the vehicle, based on motion state information of the vehicle, a respective first probability measure that the vehicle will be at the respective position at one or more future time instants; determine for the plurality of positions, based on motion state information of at least one traffic object, a respective second probability measure that the at least one traffic object will be at the respective position at the one or more future time instants; and determine for the plurality of positions, a respective combined
(Continued)

probability measure that the vehicle and the at least one traffic object will be at the respective position at the one or more future time instants.

16 Claims, 6 Drawing Sheets

(51) Int. Cl.

| | |
|---|---|
| *B60W 60/00* | (2020.01) |
| *G06N 3/02* | (2006.01) |
| *G06T 7/70* | (2017.01) |
| *G06V 10/82* | (2022.01) |
| *G06V 20/58* | (2022.01) |

(52) U.S. Cl.
CPC ............... *B60W 2554/4041* (2020.02); *B60W 2554/4042* (2020.02); *B60W 2556/10* (2020.02); *B60W 2556/45* (2020.02); *G06T 2207/20076* (2013.01); *G06T 2207/20084* (2013.01); *G06T 2207/30252* (2013.01)

(56) References Cited

U.S. PATENT DOCUMENTS

| | | | | |
|---|---|---|---|---|
| 10,860,025 | B2 | 12/2020 | Cunningham | |
| 11,634,162 | B2 * | 4/2023 | Haynes | ........... B60W 60/00272 |
| | | | | 701/27 |
| 11,966,230 | B1 * | 4/2024 | Woelki | .............. B60W 60/0027 |
| 2017/0262750 | A1 * | 9/2017 | Kozuka | ................... G06V 20/58 |
| 2020/0172098 | A1 | 6/2020 | Abrahams | |
| 2021/0039673 | A1 * | 2/2021 | Oyama | .................. G08G 1/162 |
| 2021/0139024 | A1 * | 5/2021 | Crego | .............. B60W 30/0953 |
| 2021/0286371 | A1 * | 9/2021 | Choi | ...................... G06N 3/047 |
| 2022/0032970 | A1 * | 2/2022 | Vadivelu | ................ H04W 4/46 |
| 2023/0186644 | A1 * | 6/2023 | Jagbrant | ............... G06V 10/82 |
| | | | | 382/104 |

FOREIGN PATENT DOCUMENTS

| | | | |
|---|---|---|---|
| EP | 2950294 | A1 | 12/2015 |
| EP | 3680876 | A1 | 7/2020 |
| WO | 2019191000 | A1 | 10/2019 |
| WO | 2020112649 | A1 | 6/2020 |

* cited by examiner

High risk collision (TW-TW)

TW: take the way mode

GW: give the way mode

Processing circuitry — 201

Communication interface — 203

Memory — 205

200

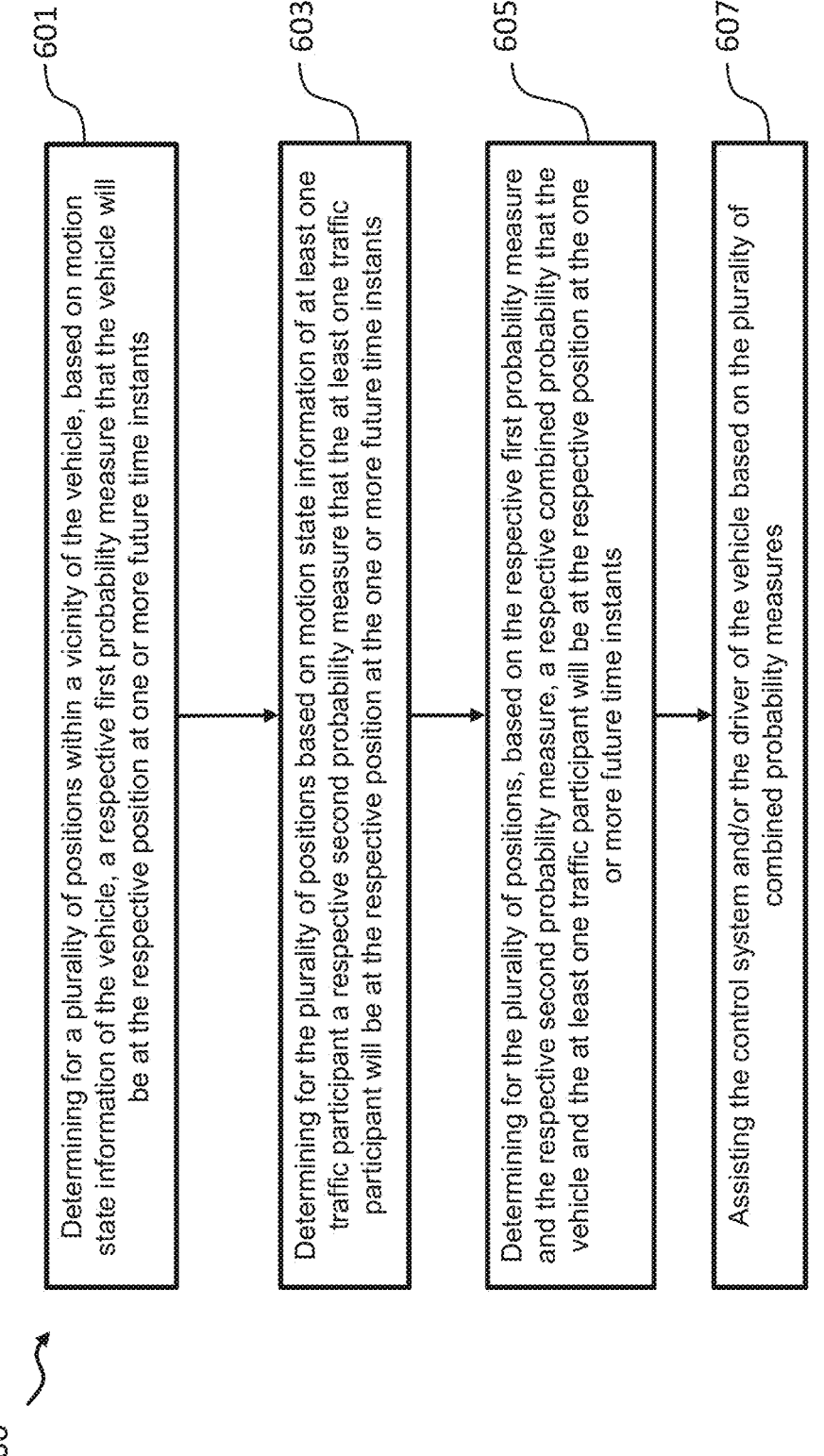

600

601

Determining for a plurality of positions within a vicinity of the vehicle, based on motion state information of the vehicle, a respective first probability measure that the vehicle will be at the respective position at one or more future time instants

603

Determining for the plurality of positions based on motion state information of at least one traffic participant a respective second probability measure that the at least one traffic participant will be at the respective position at the one or more future time instants

605

Determining for the plurality of positions, based on the respective first probability measure and the respective second probability measure, a respective combined probability that the vehicle and the at least one traffic participant will be at the respective position at the one or more future time instants

607

Assisting the control system and/or the driver of the vehicle based on the plurality of combined probability measures

Fig. 6

APPARATUS AND METHOD FOR ASSISTING AN AUTONOMOUS VEHICLE AND/OR A DRIVER OF A VEHICLE

CROSS-REFERENCE TO RELATED APPLICATIONS

This application is a continuation of International Application No. PCT/EP2021/063259, filed on May 19, 2021, the disclosure of which is hereby incorporated by reference in its entirety.

TECHNICAL FIELD

Embodiments of the present disclosure relate to devices and methods for assisting a control system and/or a driver of a vehicle, as for example used for autonomous or assisted driving.

BACKGROUND

Some known advanced driver assistance systems warn the driver of possible hazardous situations. The majority of such systems provide a so-called Forward Collision Warning (FCW) and are based on a front looking camera placed inside the host vehicle configured to acquire images of the traffic scenario in front of the host vehicle. Thus, FCW-based systems take into account only the pixels in the direction of motion of the vehicle to identify possible objects that the host vehicle could collide with (external objects could be either static objects on the road or other external traffic participants). Once hazardous objects are detected the related Time to Collision (TTC) is calculated on the simplified assumption of constant speed for both the host vehicle and the external objects. The disadvantage of these systems is that only traffic participants in the front are considered and that the TTC is calculated with a basic constant velocity prediction.

SUMMARY

Apparatuses and methods according to this disclosure allow to improve assisted or autonomous driving.

Embodiments disclosed herein allow to improve precise, yet efficient future position prediction of traffic participants. A future collision risk may be estimated comparing the future prediction for a host vehicle and for external traffic participants. The driver of the host vehicle may be warned about critical external traffic participants that may end up in a collision with him. The warning may be performed using, for instance, an acoustical signal and/or a visual signal displayed on a Head-Up Display (HUD) of the host vehicle.

According to a first aspect, an apparatus for assisting a control system and/or a driver of a host vehicle is provided. The apparatus comprises a processing circuitry configured to determine for a plurality of positions, e.g. two-dimensional spatial positions, within a vicinity, e.g. environment of the vehicle, based on motion state information of the vehicle, a respective first probability measure, e.g. probability measure distribution, that the vehicle will be at the respective position at one or more future time instants. As used herein, a probability measure may be a probability of likelihood quantified in the range from 0 to 1. As will be appreciated, a respective probability measure, e.g. probability at the plurality of (two-dimensional spatial) positions defines a probability distribution, in particular a discrete probability distribution. The one or more future time instants may define fixed time instants in the near feature, e.g. 1, 2, and 3 seconds in the future.

The processing circuitry is further configured to determine for the plurality of positions within the vicinity of the vehicle, based on motion state information of at least one traffic object, e.g. mobile traffic object, within the vicinity of the vehicle, a respective second probability measure, e.g. probability measure distribution that the at least one traffic object will be at the respective position at the one or more future time instants. The processing circuitry is further configured to determine for the plurality of positions within the vicinity of the vehicle, based on the respective first probability measure and the respective second probability measure, a respective combined probability measure, e.g. probability measure distribution, that the vehicle and the at least one traffic object will be at the respective position at the one or more future time instants. The processing circuitry is further configured to assist the control system and/or the driver of the vehicle based on the plurality of combined probability measures. The apparatus allows accurate prediction of the future position(s) of external traffic participants, allowing the driver to be warned about possible future hazardous situations or the autonomous vehicle (control system) to take appropriate counteractions.

In a further possible implementation form of the first aspect, the processing circuitry is configured to implement a neural network. The neural network may be a deep neural network comprising one or more convolutional layers. The neural network is configured to determine for the plurality of positions within the vicinity of the vehicle, based on the motion state information of the vehicle, the respective first probability measure that the vehicle will be at the respective position at the one or more future time instants. The neural network is further configured to determine for the plurality of positions, based on the motion state information of the at least one traffic object, the respective second probability measure that the at least one traffic object will be at the respective position at the one or more future time instants. The neural network implemented by the processing circuitry allows the prediction of the probability measures to be learned in a data-driven manner, leading to more realistic predictions.

In a further possible implementation form of the first aspect, for determining for the plurality of positions within the vicinity of the vehicle the respective first probability measure that the vehicle will be at the respective position and/or the respective second probability measure that the at least one traffic object will be at the respective position at the one or more future time instants the neural network is configured to (i) determine a plurality of potential routes of the vehicle and/or the at least one traffic object, (ii) determine a respective likelihood for each of the plurality of potential routes of the vehicle and/or the at least one traffic object and (iii) determine for the plurality of positions within the vicinity of the vehicle the respective first probability measure that the vehicle will be at the respective position and/or the respective second probability measure that the at least one traffic object will be at the respective position at the one or more future time instants, based on the plurality of potential routes of the vehicle and/or the at least one traffic object and the respective likelihood for each of the plurality of potential routes of the vehicle and/or the at least one traffic object. Thus, the neural network may be modularly designed in the form of a prediction pipeline. This allows a-priori information, e.g. additional information that could be available through GPS-based navigation systems, e.g. the target road to be followed, to be easily included.

In a further possible implementation form of the first aspect, the neural network comprises a map encoder configured to process map information about the vicinity of the vehicle and the neural network is configured to determine for the plurality of positions within the vicinity of the vehicle the respective first probability measure that the vehicle will be at the respective position and/or the respective second probability measure that the at least one traffic object will be at the respective position at the one or more future time instants based on the processed map information. This allows the processed map information to provide the neural network with accurate information about the vicinity of the vehicle, leading to more realistic predictions.

In a further possible implementation form of the first aspect, the map information comprises a map image, e.g. 2D map image, and the map encoder comprises a convolutional neural network configured to process, e.g. encode, the (2D) map image. The map encoder may be configured to rasterize the map information, e.g. into a squared image and to render features, such as center lanes, drivable areas and stop lines of the map image with different colors. The encoding performed by the map encoder can, for example, be learned in a data-driven manner, leading to improved processable map information.

In a further possible implementation form of the first aspect, the neural network comprises a history encoder configured to process past motion state information of the vehicle and/or the at least one traffic object. The neural network is configured to determine for the plurality of positions within the vicinity of the vehicle the respective first probability measure that the vehicle will be at the respective position and/or the respective second probability measure that the at least one traffic object will be at the respective position at the one or more future time instants based on the processed past motion state information of the vehicle and/or the at least one traffic object. The history encoder allows the neural network implemented by the processing circuitry to include processed past motion state information of the vehicle and/or the at least one traffic object for the prediction, leading to an improved prediction accuracy.

In a further possible implementation form of the first aspect, the neural network comprises a social encoder configured to model interactions between the vehicle and the at least one traffic object that affect the motion state of the vehicle and/or the at least one traffic object. The social encoder allows the neural network implemented by the processing circuitry to include processed past and/or current interactions between the vehicle and/or the at least one traffic object in the prediction, leading to improved predictions. For instance, if the vehicle is slowing down because of another vehicle, the social encoder of the neural network implemented by the processing circuitry may anticipate that the vehicle will continue to slow down for letting the other vehicle pass.

In a further possible implementation form of the first aspect, the neural network is configured to generate an image, e.g. output an image, for example a heat map, representing for the plurality of positions within the vicinity of the vehicle the respective combined probability measure that the vehicle and the at least one traffic object will be at the respective position at the one or more future time instants. Generating the heat map allows the output of the neural network to incorporate uncertainty in the prediction.

In a further possible implementation form of the first aspect, for assisting the control system of the vehicle based on the plurality of combined probability measures the processing circuitry is configured to trigger the control system to adjust a motion state of the vehicle, for example, by changing the route of or decelerating the vehicle. The control system of the vehicle can be assisted, for instance, when a high risk of collision based on the plurality of combined probability measures is imminent, e.g. when the time required for the driver to react is very short.

In a further possible implementation form of the first aspect, for assisting the driver of the vehicle based on the plurality of combined probability measures the processing circuitry is configured to trigger issuance of a visual or acoustical warning signal to the driver of the vehicle, for example indicating of a potential collision risk. The acoustical warning signal may suggest an appropriate driving maneuver to the driver for avoiding the collision. The driver of the vehicle can be assisted by the visual or acoustical warning, in particular when a high risk of collision based on the plurality of combined probability measures is detected for the near future.

In a further possible implementation form of the first aspect, the visual or acoustical warning signal is configured to assist the driver of the vehicle to identify the at least one traffic object within the vicinity of the vehicle. The visual warning signal may depend on the combined probability measures, e.g. a color or intensity of the visual warning signal may be proportional to the level of collision risk. Thus, the driver of the vehicle can be alarmed, in particular when a high risk of collision based on the plurality of combined probability measures is detected for the near future.

In a further possible implementation form of the first aspect, the processing circuitry is further configured to detect the at least one traffic object in a vicinity of the vehicle based on one or more images of the vicinity of the vehicle. Advantageously, information of a camera of the vehicle can be used to detect traffic participants, e.g. the at least one traffic object.

In a further possible implementation form of the first aspect, the motion state information of the vehicle comprises at least one of a position, for example a current position, a velocity, an acceleration, a motion direction and a route of the vehicle.

In a further possible implementation form of the first aspect, the motion state information of the at least one traffic object comprises at least one of a position, for example a current position, a velocity, an acceleration, a motion direction and a route of the at least one traffic object.

According to a second aspect, a vehicle comprising an apparatus according to the first aspect is provided.

In a further possible implementation form of the second aspect, the vehicle comprises a head-up display (HUD), or a console screen configured to display based on the plurality of combined probability measures a visual or acoustical warning signal to the driver of the vehicle, for example indicative of a potential collision risk due to other traffic participants. Thus, the driver may be warned by focusing his attention towards potentially hazardous traffic participants.

In a further possible implementation form of the second aspect, the vehicle further comprises a dashboard camera configured to capture one or more images of the vicinity of the vehicle for detecting the at least one traffic object in the vicinity of the vehicle. Thus, embodiments disclosed herein may employ readily available hardware in a hardware.

According to a third aspect, a cloud server comprising the apparatus according to the first aspect is provided. The cloud server is configured to communicate with the vehicle via a wireless communication network. The cloud server allows to crowdsource and share the information from a plurality of vehicles.

In a further possible implementation form of the third aspect, the cloud server is configured to receive from a plurality of further vehicles further motion state information of the plurality of further vehicles including occluded vehicles and/or further motion state information of a plurality of further traffic objects including occluded traffic objects within a respective vicinity of the plurality of further vehicles and to determine a further plurality of combined probability measures based on the further motion state information. The cloud server implementation allows tracking and localizing traffic participants based on the on-board sensor data of a plurality of vehicles, e.g. each traffic participant can provide information processed by its point of view. Thus, the cloud server implementation can allow identifying collision risks for traffic participants that are occluded, e.g. not in front of the vehicle.

According to a fourth aspect, a method for assisting a control system and/or a driver of a vehicle is provided. The method comprises:

determining for a plurality of within a vicinity, e.g. environment of the vehicle, based on motion state information of the vehicle, a respective first probability measure, for example probability measure distribution, that the vehicle will be at the respective position at one or more future time instants;

determining for the plurality of positions within the vicinity of the vehicle, based on motion state information of at least one traffic object within the vicinity of the vehicle, a respective second probability measure, e.g. probability measure distribution, that the at least one traffic object will be at the respective position at the one or more future time instants;

determining for the plurality of positions, based on the respective first probability measure and the respective second probability measure, a respective combined probability measure, e.g. probability measure distribution, that the vehicle and the at least one traffic object will be at the respective position at the one or more future time instants; and assisting the control system and/or the driver of the vehicle based on the plurality of combined probability measures.

The method according to the fourth aspect of the present disclosure can be performed by the apparatus according to the first aspect of the present disclosure. Thus, further features of the method according to the fourth aspect of the present disclosure result directly from the functionality of the apparatus according to the first aspect of the present disclosure as well as its different implementation forms described above and below.

According to a fifth aspect, a computer program product is provided, comprising a computer-readable storage medium for storing program code which causes a computer or a processor to perform the method according to the fourth aspect when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIG. 6 is a flow diagram illustrating a method for assisting a control system and/or a driver of a vehicle according to an embodiment.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various embodiments and/or aspects described herein may be combined with each other, unless specifically noted otherwise.

Figure 1:
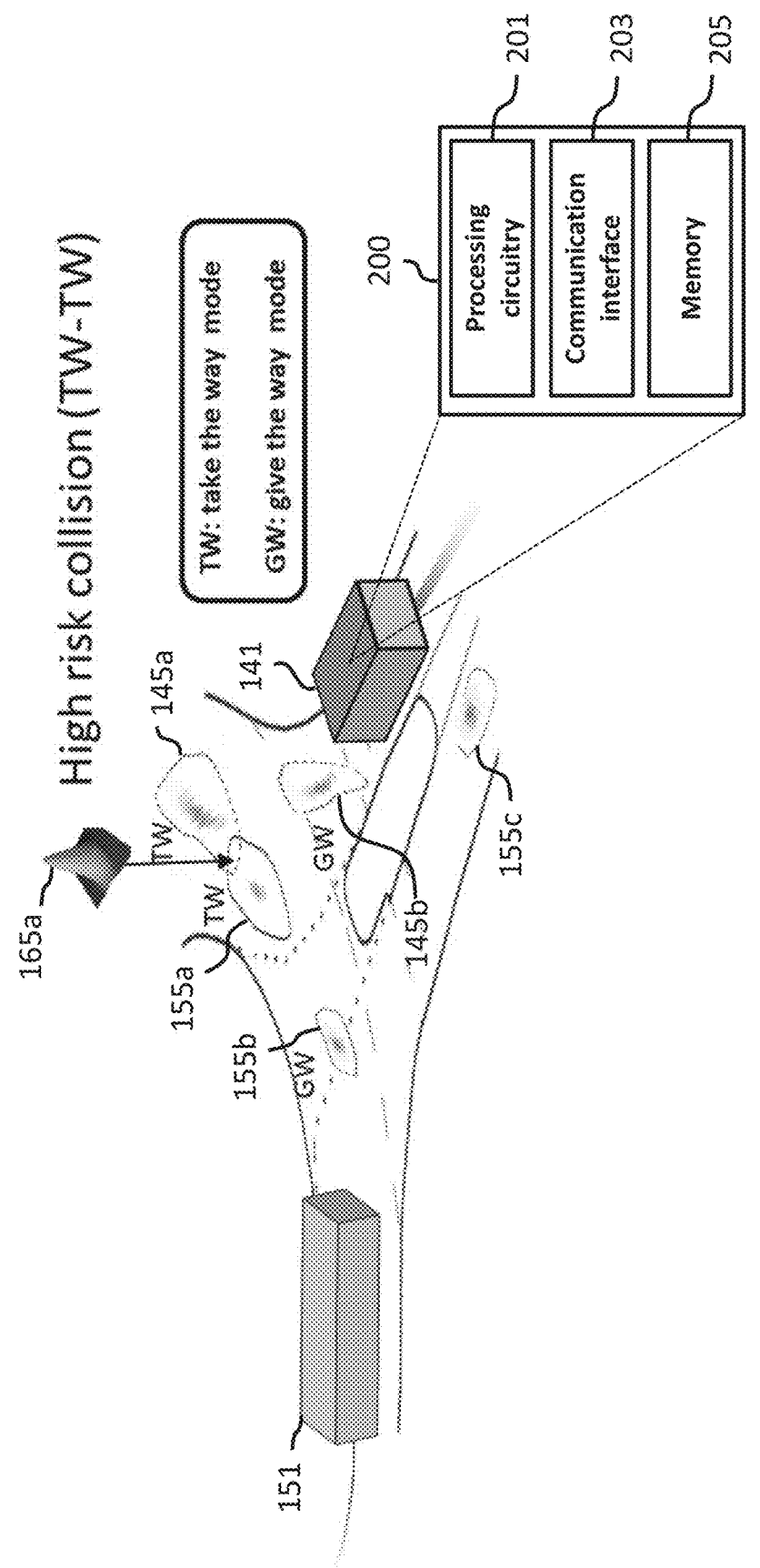
FIG. 1 shows a schematic diagram illustrating an apparatus for assisting a control system and/or a driver of a vehicle according to an embodiment in a traffic scenario.
Figure 2:
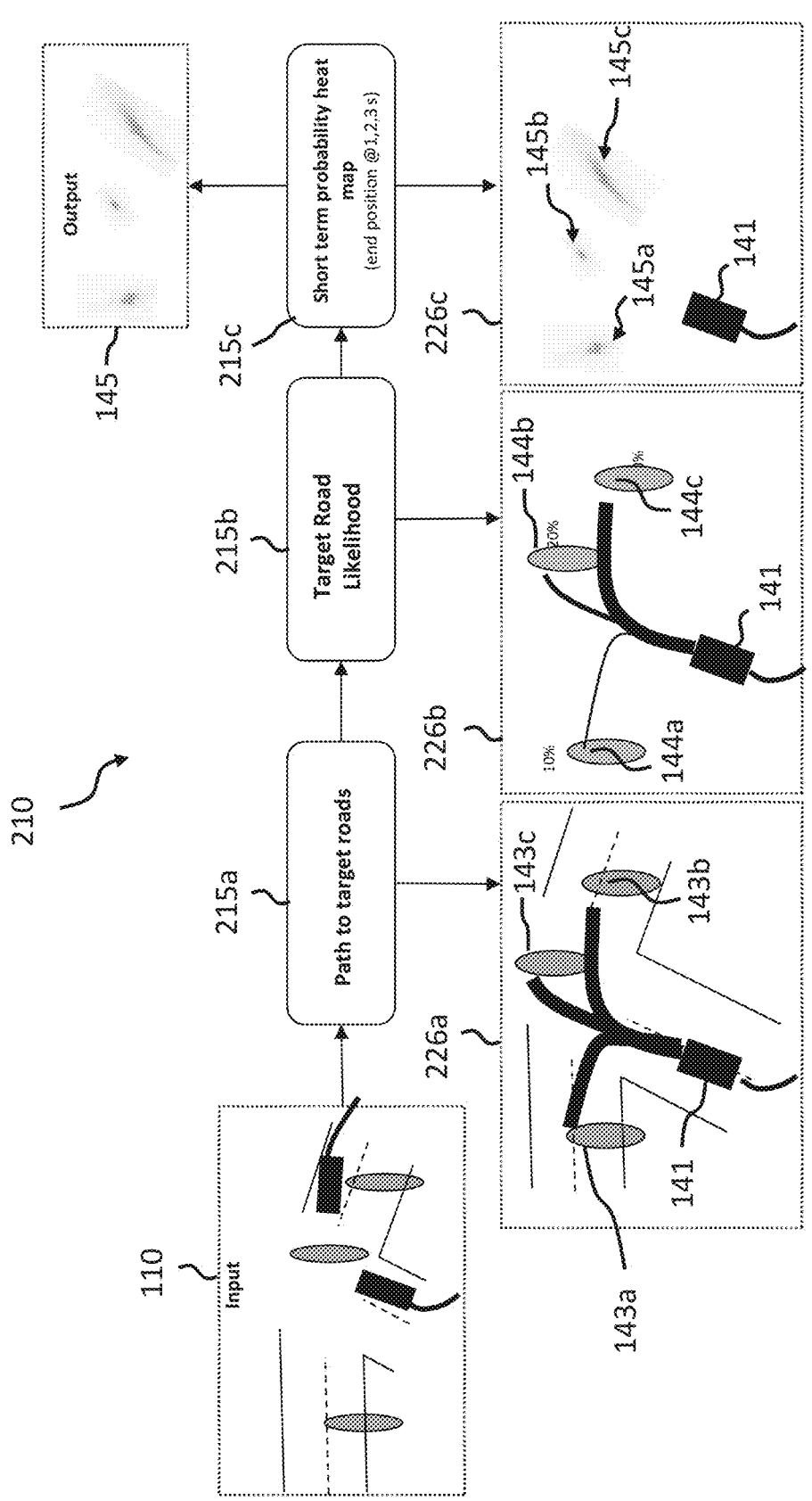
FIG. 2 shows a schematic diagram illustrating a future position prediction pipeline implemented by an apparatus for assisting a control system and/or a driver of a vehicle according to an embodiment.

FIG. 1 shows a schematic diagram illustrating an apparatus 200 for assisting a control system and/or a driver of a vehicle 141 according to an embodiment in a traffic scenario involving a further moving traffic object 151, such as a car 151. As will be described in more detail below under reference to the further figures, the apparatus 200 comprises a processing circuitry 201 configured to determine for a plurality of two dimensional (2D) spatial positions within a vicinity, e.g. environment of the vehicle 141, based on motion state information of the vehicle 141, a respective first probability measure 145a-c (the probability measure 145c is shown in FIG. 2), e.g. probability measure distribution 145a-c that the vehicle 141 will be at the respective position at one or more future time instants. The motion state information of the vehicle 141 may be obtained by a GPS-system and may comprise a position, a velocity, an acceleration, a motion direction and/or a route of the vehicle 141. The processing circuitry 201 is further configured to determine for the plurality of positions within the vicinity of the vehicle 141, based on motion state information of the at least one further traffic object 151, e.g. a parking car or a mobile traffic participant, within the vicinity of the vehicle, a respective second probability measure 155a-c, e.g. probability distribution 155a-c that the at least one traffic object 151 will be at the respective position at the one or more future time instants. The motion state information of the at least one traffic object 151 may be obtained by a camera of the vehicle 141 and may comprise a position, a velocity, an acceleration, a motion direction and/or a route of the at least one traffic object 151. As illustrated in FIG. 1, for one or more of the plurality of positions, the processing circuitry 201 of the apparatus 200 is further configured to determine, based on the respective first probability measure 145a and the respective second probability measure 155a, a respective combined probability measure 165a, e.g. probability measure distribution 165a that the vehicle 141 and the at least one traffic object 151 will be at the respective position at the one or more future time instants.

The processing circuitry 201 is further configured to assist the control system and/or the driver of the vehicle 141 based on the plurality of combined probability measures 165a. The processing circuitry 201 of the apparatus 200 may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors.

As illustrated in FIG. 1, the apparatus 200 may further comprise a communication interface 203, e.g. for sending the motion state information of the vehicle 141 over a wireless network to a cloud server, and a memory 205 configured to store data and executable program code which, when executed by the processing circuitry 201 causes the apparatus 200 to perform the functions, operations and methods described herein.

FIG. 2 shows a schematic diagram illustrating a future position prediction pipeline 210 implemented by the apparatus 200 for assisting a control system and/or a driver of a vehicle 141 according to an embodiment in a traffic scenario. A corresponding prediction method may not only predict a set of possible trajectories, e.g. route 143a-c but also a heat map 145 representing the probability distribution of the position of the vehicle 141 at a fixed time instant in the future, e.g. 3 seconds in the future. Thus, according to an embodiment, the respective first probability measure distribution 145a-c may be represented as a heat map image 145, the respective second probability measure distribution 155a-c may be represented as a heat map image 155 and/or the respective combined probability measure distributions 165a may be represented as a heat map image 165. The heat map output naturally incorporates an estimate of the uncertainty in the prediction due to sensor noise and the hidden intention of traffic participants, e.g. the vehicle 141. As will be appreciated, the prediction method is described below for the vehicle 141, but may be analogously applied to other traffic participants correspondingly, e.g. to the at least one traffic object 151.

The future prediction of the vehicle 141 may be done by the processing circuitry 201 by implementing a modular pipeline as illustrated in FIG. 2. In a first stage, the paths to all possible target roads 143a-c, e.g. routes 143a-c that the vehicle 141 could take in the future may be estimated by a path to target road estimation module 215a (implemented by the processing circuitry 201) based on the input 110. The processing circuitry 201 may be configured to generate a corresponding intermediate output 226a. The input 110 may comprise the motion state information of the vehicle 141 and, as further illustrated in FIG. 3, map information 113, e.g. a high definition (HD) map 113 comprising road information. In a second stage implemented by a route likelihood module 226b, the probability, e.g. likelihood 144a-c of each target route 143a-c, may be computed 215b based on past observations. The processing circuitry 201 may be configured to generate a corresponding intermediate output 226b. Finally, for each target route 143a-c, the respective first probability measure 145a-c in form of a respective short term probability heat map 145a-c (representing where the vehicle 141 could be in the near future, e.g. in 1, 2 or 3 seconds in the future) may be calculated 215c by a short term heat map module implemented by the processing circuitry 201, which may be represented together in a heat map 226c, here in the heatmap 145. The future position prediction pipeline 210 implemented by the processing circuitry 201 easily allows the inclusion of additional available information. For example, if the target route of a traffic participant, e.g. the vehicle 141 is known a-priori (e.g. by means of a GPS routing system), it can be directly fed to the short term heat map module in order to produce a more accurate prediction focusing only on a specific target road 143a-c.

Figure 3:
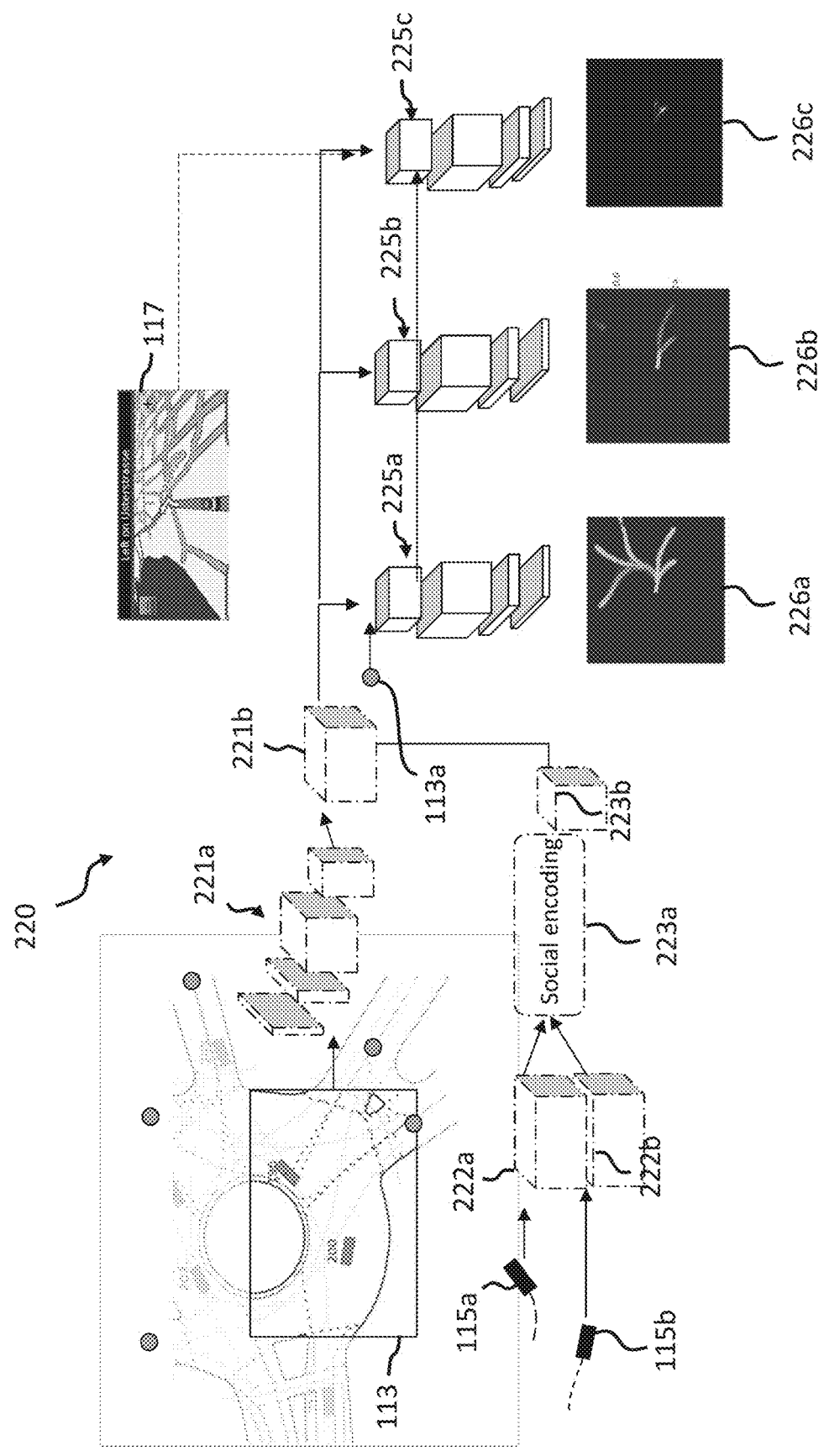
FIG. 3 shows a schematic diagram illustrating an architecture of a prediction neural network implemented by an apparatus for assisting a control system and/or a driver of a vehicle according to an embodiment.

FIG. 3 shows a schematic diagram illustrating the architecture of a prediction neural network (NN) 220 implemented by the processing circuitry 201 of the apparatus 200 for assisting a control system and/or a driver of a vehicle 141 according to an embodiment. The NN 220 may comprise a shared backbone 221a-b, 222a-b, 223a-b and three separate heads 225a-c for the respective tasks 215a-c of the future position prediction pipeline 210 (illustrated in FIG. 2). The purpose of the backbone 221a-b, 222a-b, 223a-b may be to encode the current context around the at least one traffic object 151 based on map information 113 comprising lanes and connectivity information. Past motion state information 115a-b may be further included, which may be a past history, e.g. 2 seconds, of each traffic participant, e.g. the vehicle 141, the at least one traffic object 151 and/or further traffic participants. The past motion state information 115a-b may comprise a position, a velocity, an acceleration, a motion direction and/or a route of the respective traffic participant.

The map information 113 may be rasterized into a squared image, wherein center lanes, drivable areas and stop lines may be rendered with different colors. Center lane direction may be also encoded with different colors. The rasterized map information 113 may then be encoded 221a using a Convolutional Neural Network (CNN) by a map encoder 221b.

A history encoder 222a-b may be used to encode the past motion state information 115a-b of each traffic participant using Recurrent Neural Networks (RNN). In order to efficiently encode 223a interactions between the traffic participants an attention mechanism may be implemented by a social encoder 223b.

A short term probability heatmap 226c output together with intermediate outputs 226a-b as well as a path to possible target roads 226a and a target road probability 226b, may be provided by the NN 220 in the form of squared images 226a-c. The short term probability heatmap 226c may be the heat map 155 representing the second probability measure distribution 155a-c, the heat map 145 representing the first probability measure distribution 145a-c or a heat map representing a further probability measure distribution corresponding to a further traffic participant.

Additionally, target road information 113a may be fed to the NN 220 and/or, if known, e.g. by means of a GPS routing system, a-priori target road information 117 comprising a-priori knowledge of the target road.

Starting from a feature vector obtained by encoding using the backbone 221a-b, 222a-b, 223a-b, the intermediate outputs 225b-c and/or the short term probability heatmap 226c may be respectively produced through a CNN image decoder associated with the three separate heads 225a-c.

Figure 4:
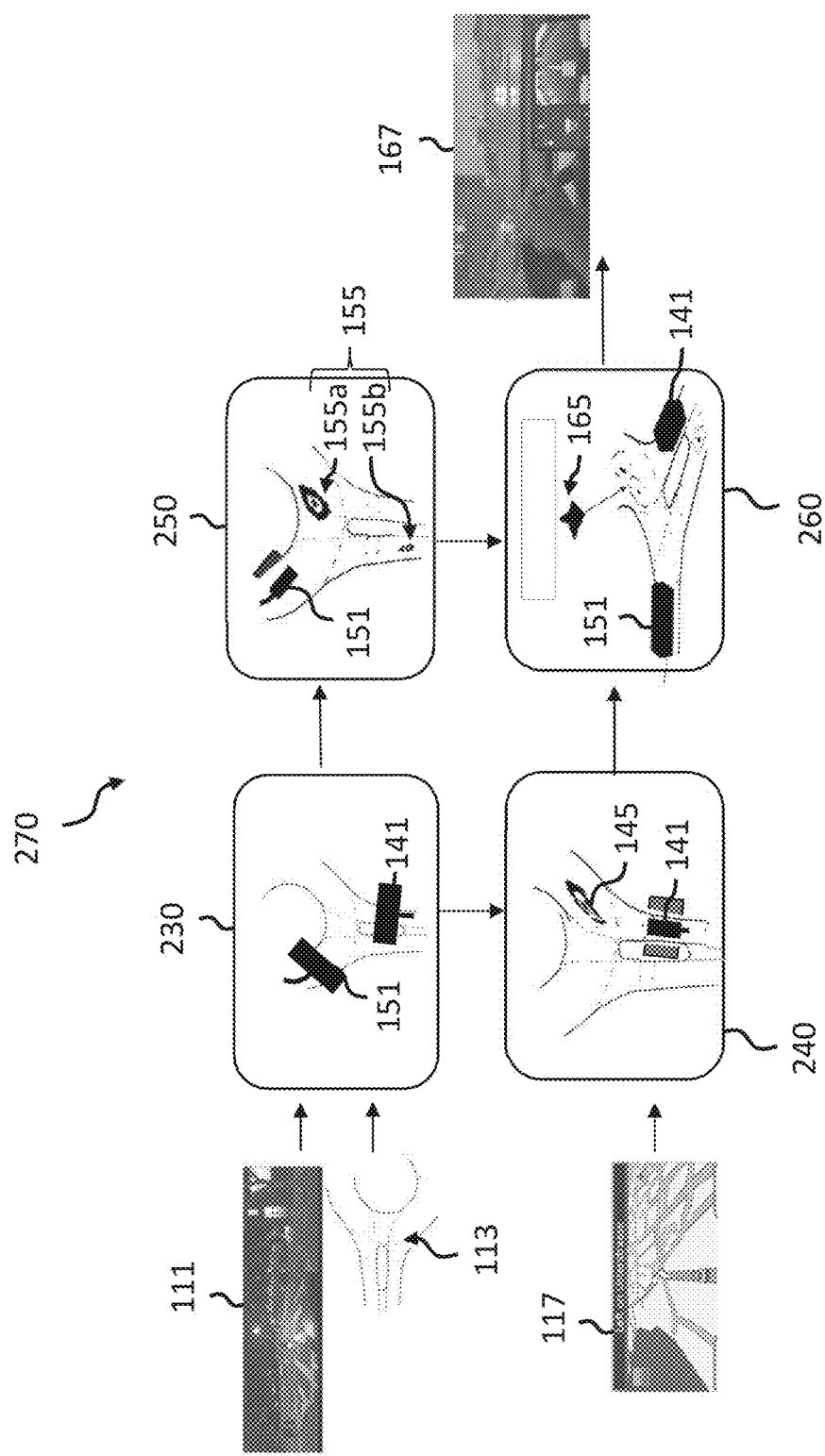
FIG. 4 shows a schematic diagram illustrating a system pipeline of an apparatus for assisting a control system and/or a driver of a vehicle according to an embodiment.

FIG. 4 shows a schematic diagram illustrating a system pipeline 270 implemented by the apparatus 200 for assisting a control system and/or a driver of a vehicle 141 according to an embodiment in a traffic scenario. In a first "Agent Tracking and Localization" stage 230 images 111 may be acquired from the camera of the vehicle 141 in the form of a sensor stream 111 and external traffic participants in the scene, e.g. the at least one traffic object 151 are identified. Detected traffic participants, e.g. the at least traffic object 151 along with the vehicle 141 are then localized inside the High Definition Map 113, e.g. the map information 113. Computer vision object detection and tracking may be used in this stage. By way of example, in the traffic scenario illustrated in FIG. 4, the vehicle 141 is approaching a roundabout and the at least one traffic object 151 is detected inside the roundabout.

In a second "Ego Driver Future Prediction" stage 240 based on the context information obtained in the first stage, the future position of the vehicle 141 may be predicted using the future position prediction pipeline 210 shown in FIG. 2 and the NN 220 shown in FIG. 3. If for the vehicle 141 a GPS-like routing is available, this information 117 may be fed to the future position prediction pipeline 210 and/or to the NN 220 to focus the prediction only on the target road of the vehicle 141. The future position prediction may be calculated in form of a heat map 145 representing the probability distribution of the future position of the vehicle 141.

In a third "External traffic participant prediction" stage 250 based on the context information obtained in the first step, the future position of the at least one traffic object 151 may be predicted using the future position prediction pipeline 210 shown in FIG. 2 and the NN 220 shown in FIG. 3. As it is unlikely that for external traffic participants the GPS-like future route is available, the prediction output may cover all the probable future roads reachable. As shown in FIG. 3, the at least one traffic object 151 could either exit the roundabout or continue to drive on it, therefore the future position heat map 155 may comprise two distinct high probability areas 155a, 155b.

In a fourth "Risk Calculation" stage 260 a future collision risk is calculated by comparing the probability distribution of the vehicle 141, e.g. the ego driver position $p_{ego}$ and the probability distribution of the at least one traffic object 151, e.g. the external traffic participant $p_{traffic}$. The collision risk $p_{crash}$, which indicates the certainty of the collision prediction, is high when both the vehicle 141, e.g. the ego vehicle 141 and the traffic participant 151, e.g. the at least one traffic object 151 have a high probability to be in the same location x, y at a time t. In an embodiment, this is implemented by the processing circuitry 201 of the apparatus 200 by multiplying the two probability distributions:

$$p_{crash}(x, y, t) = p_{ego}(x, y, t) * p_{traffic}(x, y, t)$$

FIG. 1 further shows how a high risk of collision is calculated in the case, that the vehicle driver 141 continues entering the roundabout without giving the way to the approaching external traffic participant 151, e.g. the at least one traffic object 151. In fact, there is an overlap 145a, 155a of the two predicted heat maps 145, 155 inside the roundabout representing the case where none of the traffic participants slows down for letting the other pass (also referenced by "TW" in FIG. 1).

If a collision risk for the vehicle 141 is detected, the external traffic participant of interest, e.g. the at least one traffic object 151 may be identified among a plurality of traffic participants. The driver may be assisted 167, e.g. warned 167 by highlighting the specific traffic participant of interest, e.g. the at least one traffic object 151 in a HUD and/or display of the vehicle 141 with a particular color. The color intensity may be proportional to the level of risk $p_{crash}$ and to the TTC, e.g. how close in time the collision is. An acoustic warning may also be provided in case of a high risk of collision, suggesting an appropriate maneuver. In the case of FIG. 4 such an acoustic warning may for example be "Attention: slow down for incoming vehicle".

In a further embodiment, where the vehicle 141 may be an autonomous vehicle 141, the processing circuitry 201 may be configured for assisting 167 the control system of the vehicle 141 based on the plurality of combined probability measures 165a to trigger the control system to adjust a motion state of the vehicle 141, such as changing the direction of the vehicle 141.

Figure 5:
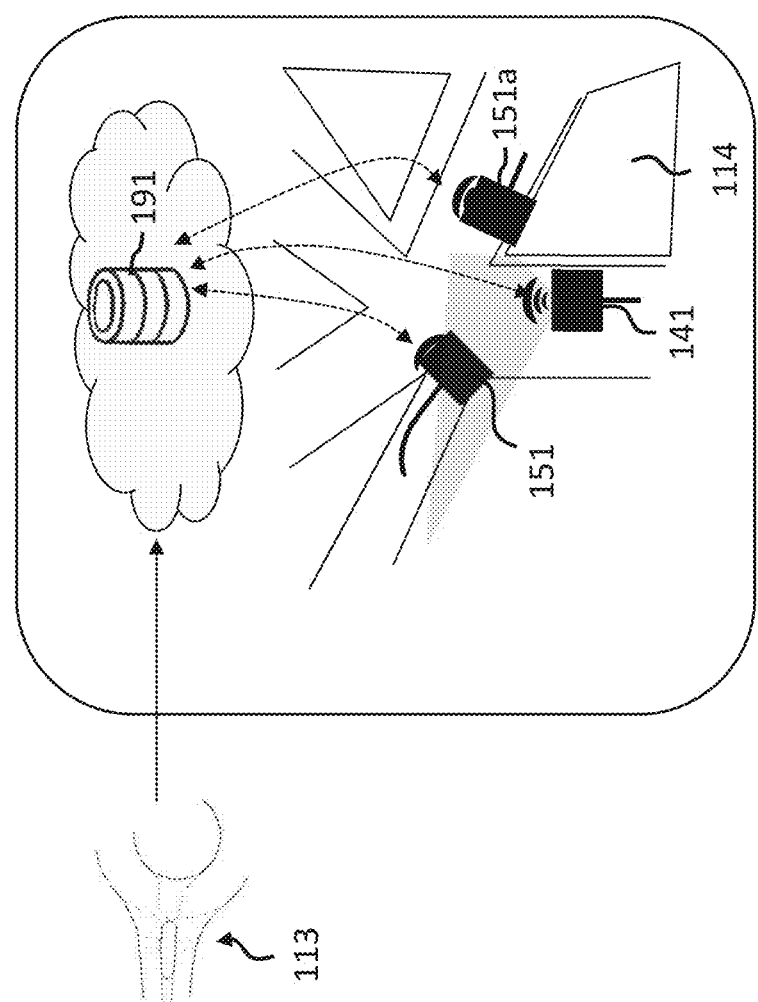
FIG. 5 shows a schematic diagram illustrating a cloud-server comprising an apparatus for assisting a control system and/or a driver of a vehicle according to an embodiment in a traffic scenario.

FIG. 5 shows a schematic diagram illustrating an embodiment of the apparatus 200 within a cloud server 191 implementation for a traffic scenario, including the vehicle 141, the at least one traffic object 151 and a further traffic object 151a. The reliability and efficacy of the apparatus 200 can greatly benefit from information, e.g. motion state information sharing among the traffic participants 141, 151, 151a by crowdsource aid. By collecting motion state information coming from all traffic participants 141, 151, 151a by the cloud server 191 the quality of the global context representation can be largely improved. The benefit of having information sharing is that the tracking and localization of the traffic participants 141, 151, 151a does not only rely on on-board sensors but each traffic participant 141, 151, 151a may communicate to the cloud server 191 its motion state information, e.g. localization and its past motion state information 115a-b, e.g. history computed from its point of view. The cloud server 191 may then provide a global representation of the scene to all traffic participants 141, 151, 151a. This may not only make the positioning and tracking of traffic participants 141, 151, 151a less noisy but could handle occlusions. In the traffic scenario shown in FIG. 5, the further traffic object 151*a* cannot be detected by the vehicle 141 because there is a building 114 occluding its Field of View (FOV). By means of the cloud server 191 the position of the further traffic object 151*a* may be included in the context even if occluded.

In the following, under reference to FIG. 4 the main stages of the system pipeline 270 are described for a "crowd-source" embodiment including the cloud server 191.

During the "Agent tracking and localization" stage 230 all vehicles 141, 151, 151*a* send own motion state information and the motion state information of external traffic partici-pants detected in the respective FOV to the cloud server 191 at a predefined frequency (at least 10 Hz). The cloud server 191 may combine all the motion states received and the HD map 113, e.g. the map information 113 into a global context. The global context may consist of the post-processed motion states for all traffic participants 141, 151, 151*a* resulting from the fusion of all the received motion states. All the traffic participants 141, 151, 151*a* may also be localized on in the HD map 113, e.g. the map information 113 of the area. The post-processed motion states are less sensitive to sensor noises. Furthermore, traffic participants, e.g. the further traffic object 151*a* that are occluded in the FOV of the vehicle 141 are also included in the global context as a result of the crowdsource information sharing.

Future position prediction may be computed for each traffic participant 141, 151, 151*a* in the cloud server 191 using the future position prediction pipeline 210 shown in FIG. 2. The vehicle 141 may query the future prediction for itself, e.g. during the "ego driver future prediction" stage 240 and for external traffic participants in its neighborhood, e.g. during the "external traffic prediction" stage 250 from the cloud server 191. This allows most of the computation to be run on the cloud server 191 and shared among traffic participants. During the "Risk calculation" stage 260 the collision risk and the driver warning may be computed on board of the vehicle 141 as described above.

Thus, embodiments of the apparatus 200 disclosed herein may be characterized by three main building blocks: (i) traffic participants' future position prediction, (ii) collision risk evaluation and (iii) driver warning. The collision risk is estimated by comparing the future position predicted for the host vehicle 141 and for other traffic participants 151, 151*a*. If the estimated future positions overlap, which may be determined if the heatmaps 145, 155 overlap, there is a high risk of future collision. If the heat maps 145, 155 calculated by the prediction stage are used, the collision risk naturally includes the uncertainty in the estimation leading to a more reliable risk estimation. Compared to FCW used in L2 ADAS systems, the collision warning may take into account possible collisions with traffic participants 151, 151*a* com-ing from side roads or roundabouts and the prediction system is more sophisticated than a simple constant velocity assumption, because it takes advantage of the knowledge of the map information, e.g. HD map 113 and it is fully learned in a data-driven manner, leading to more realistic predic-tions.

Once the collision risk is evaluated, the driver may be warned 167 of possible hazardous situations. Since the collision risk is evaluated explicitly between the host vehicle 141 and each external traffic participants 151, 151*a*, it is possible to regress which traffic participant 151, 151*a* is really critical for the host vehicle 141 safety, e.g. if the heatmaps 145, 155 of host vehicle 141 and external traffic participants 151, 151*a* overlap, that participant 151, 151*a* is regressed critical. The driver may therefore be warned 167 by smoothly shifting its attention in the direction of critical traffic participants 151, 151*a* by highlighting the traffic participants position on the HUD (and/or in any other acoustic and/or visual way).

FIG. 6 is a flow diagram illustrating a method 600 for assisting a control system and/or a driver of a vehicle 141 according to an embodiment. The method 600 comprises a first step 601 of determining for a plurality of two-dimen-sional spatial positions within a vicinity, e.g. environment of the vehicle 141, based on motion state information of the vehicle 141, a respective first probability measure 145*a-c*, e.g. probability measure distribution 145*a-c* that the vehicle 141 will be at the respective position at one or more future time instants.

The method 600 comprises a further step 603 of deter-mining for the plurality of positions within the vicinity of the vehicle 141, based on motion state information of the at least one traffic object 151 within the vicinity of the vehicle 141, a respective second probability measure 155*a-c*, e.g. prob-ability measure distribution 155*a-c* that the at least one traffic object 151 will be at the respective position at the one or more future time instants.

The method 600 comprises a further step 605 of deter-mining for the plurality of positions within the vicinity of the vehicle 141, based on the respective first probability mea-sure 145*a-c* and the respective second probability measure 155*a-c*, a respective combined probability measure 165*a*, e.g. probability measure distribution 165*a* that the vehicle and the at least one traffic object 151 will be at the respective position at the one or more future time instants.

The method 600 comprises a further step 607 of assisting the control system and/or the driver of the vehicle 141 based on the plurality of combined probability measures 165*a*.

As the method 600 can be implemented by the apparatus 200, further features of the method 600 result directly from the functionality of the apparatus 200 and its different embodiments described above and below.

The person skilled in the art will understand that the "blocks" ("units") of the various figures (method and appa-ratus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present dis-closure, it should be understood that the disclosed system, apparatus, and method may be implemented in other man-ners. For example, the described embodiment of an appa-ratus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the appa-ratuses or units may be implemented in electronic, mechani-cal, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

What is claimed is:

1. An apparatus for assisting a control system and/or a driver of a vehicle, the apparatus comprising:
processing circuitry configured to:
determine, by implementing an artificial neural network and based on motion state information of the vehicle, a first heat map image representing probabilities that the vehicle will be at respective positions of a plurality of positions at one or more future time instants, and
determine, by implementing the artificial neural network and based on motion state information of at least one traffic object, a second heat map image representing probabilities that the at least one traffic object will be at the respective positions of the plurality of positions at the one or more future time instants;
determine for the plurality of positions, based on the first heat map image and the second heat map image, a third heat map image representing probabilities that the vehicle and the at least one traffic object will be at the respective positions of the plurality of positions at the one or more future time instants; and
control, based on the third heat map image indicating a risk of collision that exceeds a threshold, the vehicle to:
cause a deceleration and/or a change in a route of the vehicle, and/or
issue a visual or acoustical warning signal to the driver of the vehicle,
wherein the artificial neural network comprises a social encoder configured to:
receive encoded past motion state information of the vehicle and encoded past motion state information of the at least one traffic object, and
generate, using an attention mechanism, encoded interactions between the vehicle and the at least one traffic object.

2. The apparatus of claim 1, wherein in determining the respective first heat map, the artificial neural network is configured to decode a feature vector, generated based on the encoded interactions between the vehicle and the at least on traffic object, by a multi-head decoder to:
determine a plurality of potential routes of the vehicle;
determine a respective likelihood for each of the plurality of potential routes of the vehicle; and
determine, for the plurality of positions and based on the plurality of potential routes of the vehicle and/or the respective likelihood for each of the plurality of potential routes of the vehicle, the respective first heat map image.

3. The apparatus of claim 1, wherein the artificial neural network further comprises a map encoder configured to process map information about the vicinity of the vehicle, and
wherein the neural network is configured to decode a feature vector, generated based on both (i) the encoded interactions between the vehicle and the at least one traffic object and (ii) the encoded map information, by a multi-head decoder to:
determine, for the plurality of positions, the respective first heat map image.

4. The apparatus of claim 3, wherein the map information comprises a map image, and wherein the map encoder comprises a convolutional neural network configured to process the map image.

5. The apparatus of claim 1, wherein the neural network further comprises a first history encoder configured to process past motion state information of the vehicle to generate the encoded past motion state information of the vehicle and a second history encoder configured to process past motion state information of the at least one traffic object to generate the encoded past motion state information of the at least one traffic object.

6. The apparatus of claim 1, wherein the visual or acoustical warning signal is configured to assist the driver of the vehicle to identify the at least one traffic object within the vicinity of the vehicle.

7. The apparatus of claim 1, wherein the processing circuitry is further configured to detect the at least one traffic object in a vicinity of the vehicle based on one or more images of the vicinity of the vehicle.

8. The apparatus of claim 1, wherein the motion state information of the vehicle comprises at least one of a position, a velocity, an acceleration, a motion direction and a route of the vehicle.

9. The apparatus of claim 1, wherein the motion state information of the at least one traffic object comprises at least one of a position, a velocity, an acceleration, a motion direction and a route of the at least one traffic object.

10. A vehicle comprising an apparatus according to claim 1.

11. The vehicle of claim 10, wherein the vehicle comprises a head-up display (HUD) or a console screen configured to display the visual or acoustical warning signal to the driver of the vehicle.

12. The vehicle of claim 10, wherein the vehicle further comprises a dashboard camera configured to capture one or more images of the vicinity of the vehicle for detecting the at least one traffic object in the vicinity of the vehicle.

13. A cloud server comprising the apparatus of claim 1, wherein the cloud server is configured to communicate with the vehicle via a wireless communication network.

14. The cloud server of claim 13, wherein the cloud server is configured to receive, from a plurality of further vehicles, further motion state information of the plurality of further vehicles and/or further motion state information of a plurality of further traffic objects within a respective vicinity of the plurality of further vehicles, and to determine a further plurality of combined probability measures based on the further motion state information.

15. A method for assisting a control system and/or a driver of a vehicle, the method comprising:
determine, by implementing an artificial neural network and based on motion state information of the vehicle, a first heat map image representing probabilities that the vehicle will be at respective positions of a plurality of positions at one or more future time instants, and
determine, by implementing the artificial neural network and based on motion state information of at least one traffic object, a second heat map image representing probabilities that the at least one traffic object will be at the respective positions of the plurality of positions at the one or more future time instants;
determining for the plurality of positions, based on the first heat map image and the second heat map image, a third heat map image representing probabilities that the vehicle and the at least one traffic object will be at the respective positions of the plurality of positions at the
one or more future time instants; and
controlling, based on the third heat map image indicating
a risk of collision that exceeds a threshold, the vehicle
to:
cause a deceleration and/or a change in a route of the
vehicle, and/or
issue a visual or acoustical warning signal to the driver
of the vehicle,
wherein the artificial neural network comprises a social
encoder configured to:
receive encoded past motion state information of the
vehicle and encoded past motion state information of
the at least one traffic object, and
generate, using an attention mechanism, encoded inter-
actions between the vehicle and the at least one
traffic object.
16. A non-transitory computer-readable storage medium
having stored thereon processor-executable code that, upon
execution by a computer or a processor, causes the computer
or the processor to perform the method of claim 15.

* * * * *